(12) United States Patent
Chang

(10) Patent No.: US 6,519,818 B1
(45) Date of Patent: Feb. 18, 2003

(54) HOOK DEVICE

(76) Inventor: Vincent Chang, 58, Ma Yuan West St., Taichung (TW)

(*) Notice: Subject to any disclaimer, the term of this patent is extended or adjusted under 35 U.S.C. 154(b) by 0 days.

(21) Appl. No.: 10/073,788

(22) Filed: Feb. 8, 2002

(51) Int. Cl.[7] .............................................. A44B 21/00
(52) U.S. Cl. .................................................. 24/599.4
(58) Field of Search ........................... 24/265 H, 592.1, 24/369–376, 588.1, 697.2, 598.1–601.9, 698.1, 905, 713.9–714.5, 907; 43/42.37, 42.38, 42.44, 43.15, 43.6; 294/82.17, 82.19–82.23; 59/84, 85, 86

(56) References Cited

U.S. PATENT DOCUMENTS

| | | | | |
|---|---|---|---|---|
| 988,499 A | * | 4/1911 | Owen | 24/600.9 |
| 1,007,213 A | * | 10/1911 | Lau | 24/599.5 |
| 1,092,238 A | * | 4/1914 | Baxter | 24/599.6 |
| 1,493,703 A | * | 5/1924 | Rice | 294/82.19 |
| 4,454,635 A | * | 6/1984 | Russell | 24/462 |
| 5,127,219 A | * | 7/1992 | Herron et al. | 59/93 |
| 5,274,946 A | * | 1/1994 | Fusco | 43/43.2 |
| 5,832,572 A | * | 11/1998 | Norrby | 24/600.9 |
| 5,867,877 A | * | 2/1999 | Patterson et al. | 24/598.5 |
| 5,913,479 A | * | 6/1999 | Westwood, III | 24/298 |
| 5,937,490 A | * | 8/1999 | Mihailovic | 24/600.1 |
| 6,195,848 B1 | * | 3/2001 | Jackson et al. | 24/68 CD |

* cited by examiner

Primary Examiner—Robert J. Sandy
Assistant Examiner—Ruth C. Rodriguez

(57) ABSTRACT

A hook device has a main body having a connection portion and a hook portion, and a movable fastener disposed on the main body. The movable fastener has a corrugated plate having two curved end portions and a U-shaped middle portion having a plurality of through holes, and an elastic element having a first L-shaped portion and a second L-shaped portion. The curved end portions of the movable fastener encloses the connection portion of the main body. The first L-shaped portion of the elastic element and the second L-shaped portion of the elastic element pass through the through holes of the U-shaped middle portion of the corrugated plate.

2 Claims, 4 Drawing Sheets

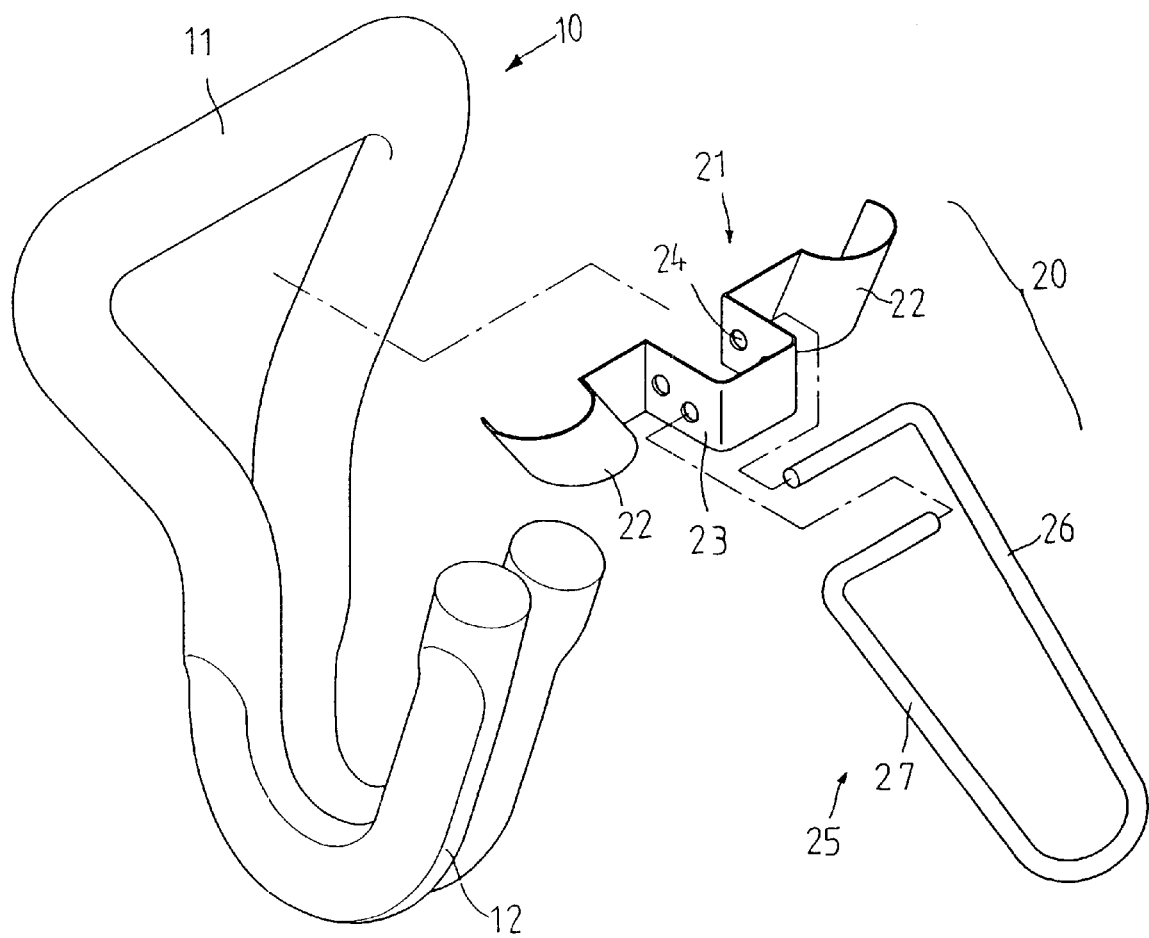
F I G. 1

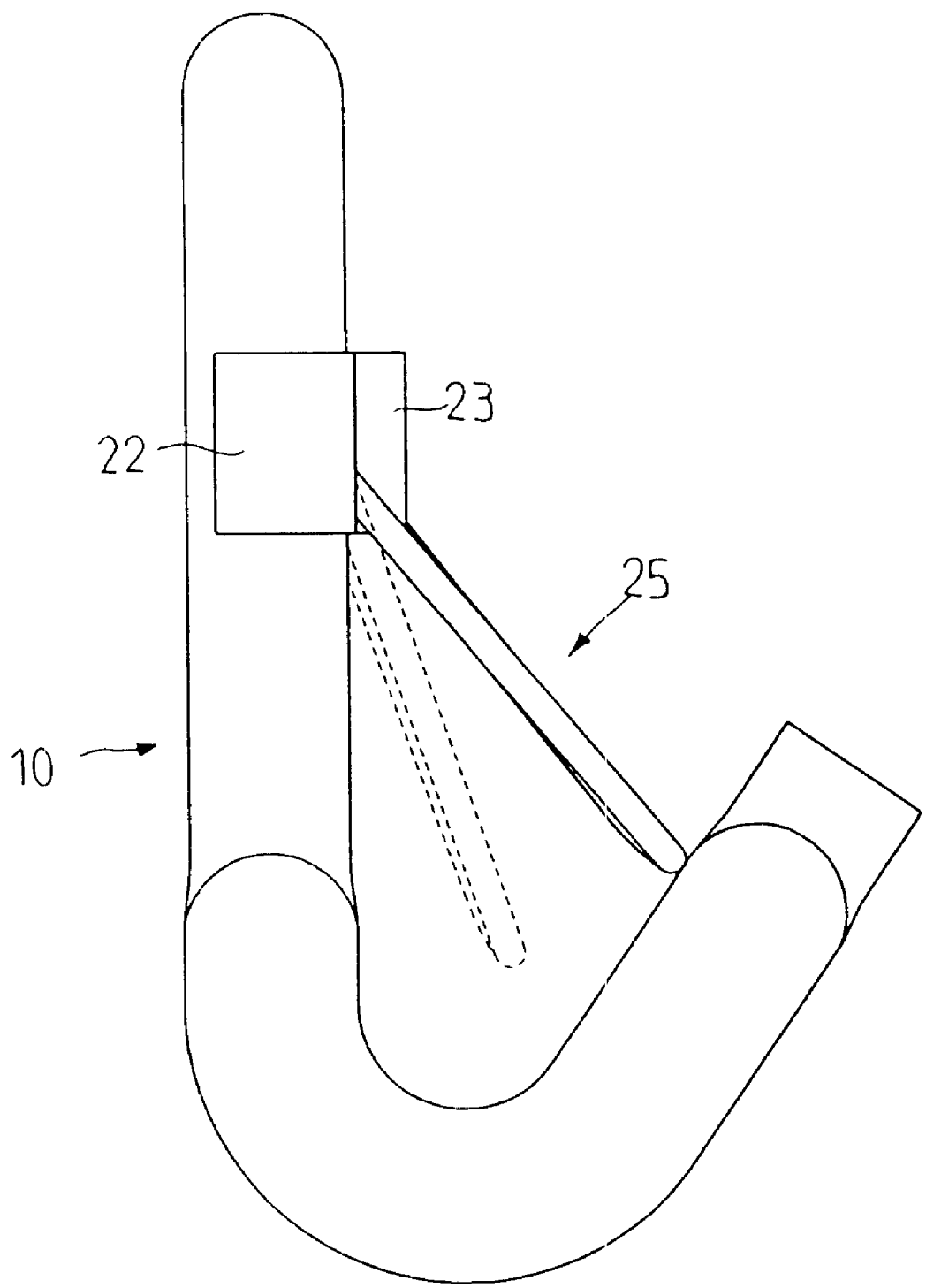
F I G. 3

HOOK DEVICE

BACKGROUND OF THE INVENTION

The present invention relates to a hook device. More particularly, the present invention relates to a hook device which can hook a heavy article safely.

A conventional safety hook is often soldered with a safety buckle. However, the conventional safety hook and the safety buckle are weakened by a heat treatment. Thus the conventional safety hook and the safety buckle will be broken while carrying a heavy article.

SUMMARY OF THE INVENTION

An object of the present invention is to provide a hook device which can hook a heavy article safely.

Another object of the present invention is to provide a hook device which has a movable fastener surrounding a main body without any rivet so that a structure of the main body will not be weakened.

Another object of the present invention is to provide a movable fastener which has an elastic element to engage with a hook portion of a main body stably.

Accordingly, a hook device comprises a main body having a connection portion and a hook portion, and a movable fastener disposed on the main body. The movable fastener has a corrugated plate having two curved end portions and a U-shaped middle portion having a plurality of through holes, and an elastic element having a first L-shaped portion and a second L-shaped portion. The curved end portions of the movable fastener encloses the connection portion of the main body. The first L-shaped portion of the elastic element and the second L-shaped portion of the elastic element pass through the through holes of the U-shaped middle portion of the corrugated plate.

BRIEF DESCRIPTION OF THE DRAWINGS

FIG. 1 is a perspective exploded view of a hook device of a preferred embodiment in accordance with the present invention;

FIG. 3 is a schematic view illustrating an operation of an elastic element of a preferred embodiment in accordance with the present invention.

DETAILED DESCRIPTION OF THE INVENTION

Figure 2:
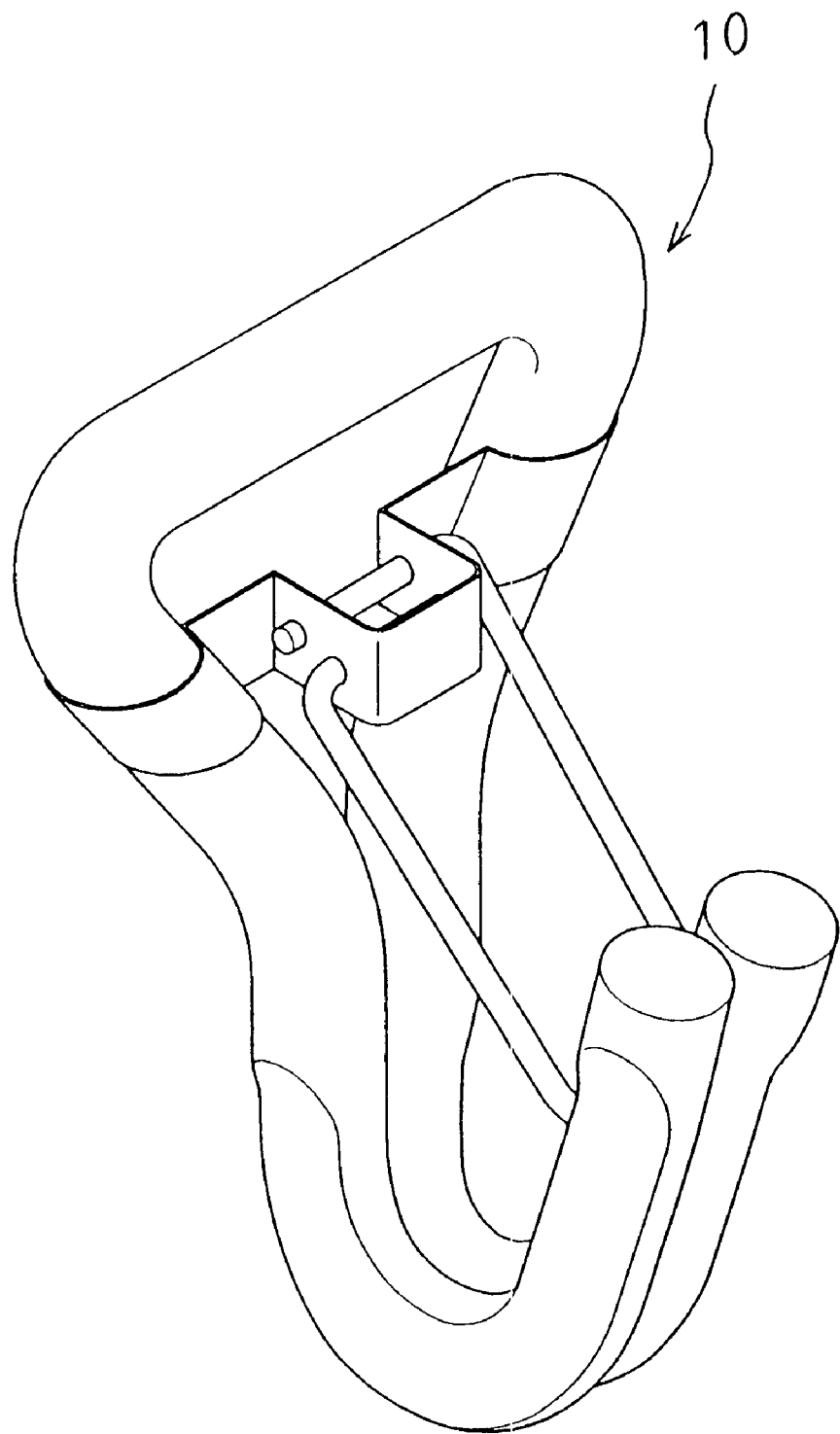
FIG. 2 is a perspective assembly view of a hook device of a preferred embodiment in accordance with the present invention.
Figure 4:
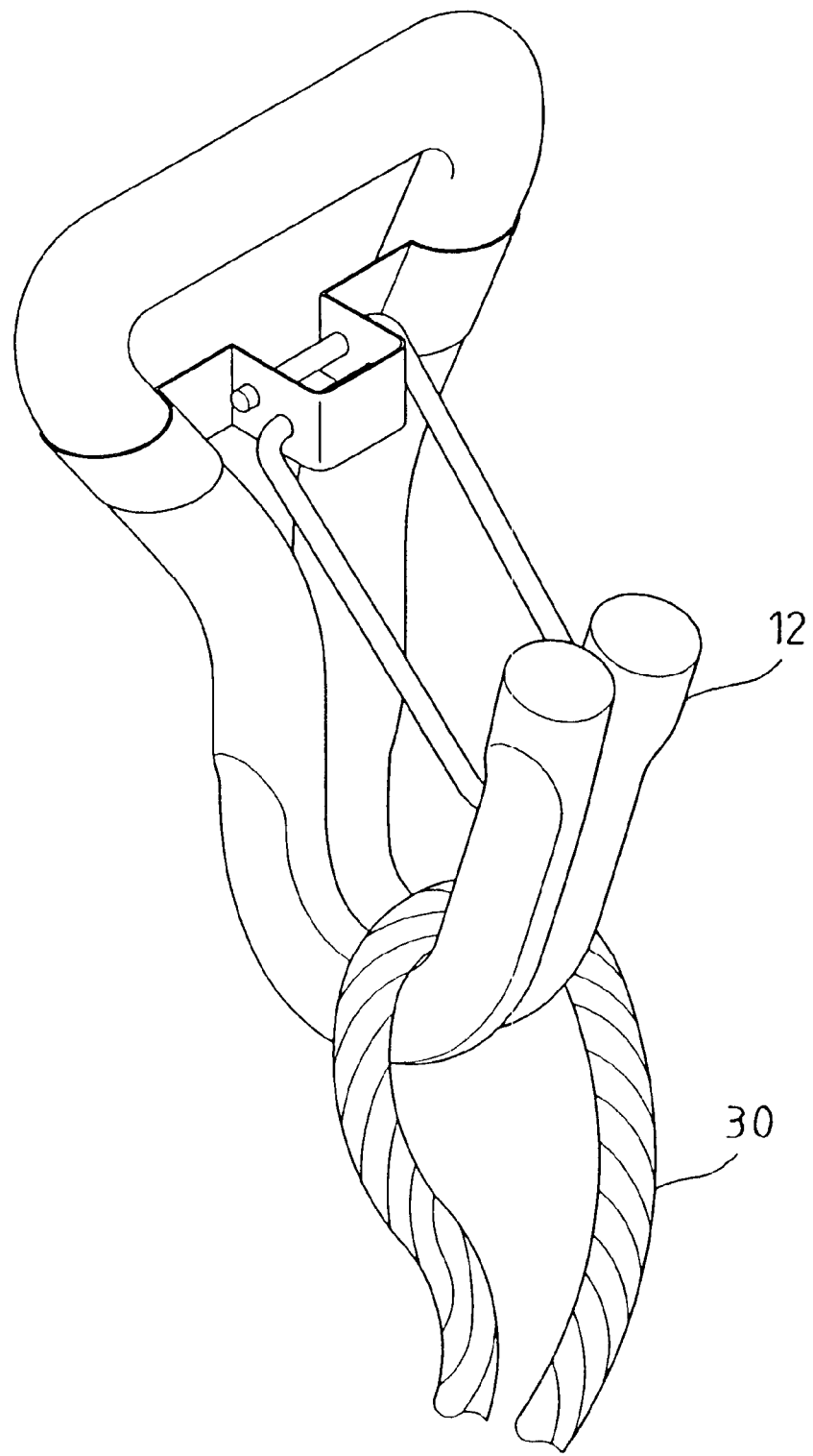
FIG. 4 is a schematic view illustrating an application of a hook device of a preferred embodiment in accordance with the present invention.

Referring to FIGS. 1 to 4, a hook device comprises a main body 10 having a connection portion 11 and a hook portion 12, and a movable fastener 20 disposed on the main body 10.

The movable fastener 20 has a corrugated plate 21 having two curved end portions 22 and a U-shaped middle portion 23 having a plurality of through holes 24, and an elastic element 25 having a first L-shaped portion 26 and a second L-shaped portion 27.

The curved end portions 22 of the movable fastener 20 encloses the connection portion 11 of the main body 10.

The first L-shaped portion 26 of the elastic element 25 and the second L-shaped portion 27 of the elastic element 25 pass through the through holes 24 of the U-shaped middle portion 23 of the corrugated plate 21.

Since the first L-shaped portion 26 of the elastic element 25 is longer than the second L-shaped portion 27 of the elastic element, the first L-shaped portion 26 of the elastic element 25 has a larger moment of force. Therefore, the corrugated plate 21 is pressed toward the connection portion 11 of the main body 10.

The main body 10 is formed by bending a metal rod. A diameter of the hook portion 12 of the main body 10 is larger than a diameter of the connection portion 11 of the main body 10.

Referring to FIG. 4 again, a rope 30 is hung on the hook portion 12 of the main body 10.

The present invention has the following advantages. The hook device can hook a heavy article safely. The movable fastener surrounds the main body without any rivet so that a structure of the main body will not be weakened.

The present invention is not limited to the above embodiments but various modification thereof may be made. Furthermore, various changes in form and detail may be made without departing from the scope of the present invention.

I claim:

1. A hook device comprises:

a main body having a connection portion and a hook portion, and a movable fastener disposed on the main body, the movable fastener having a corrugated plate having two curved end portions and a U-shaped middle portion having a plurality of through holes, and an elastic element having a first L-shaped portion and a second L-shaped portion, the curved end portions of the movable fastener enclosing the connection portion of the main body, and the first L-shaped portion of the elastic element and the second L-shaped portion of the elastic element passing through the through holes of the U-shaped middle portion of the corrugated plate.

2. The hook device as claimed in claim 1, wherein a diameter of the hook portion of the main body is larger than a diameter of the connection portion of the main body.

* * * * *